Patented Sept. 12, 1922.

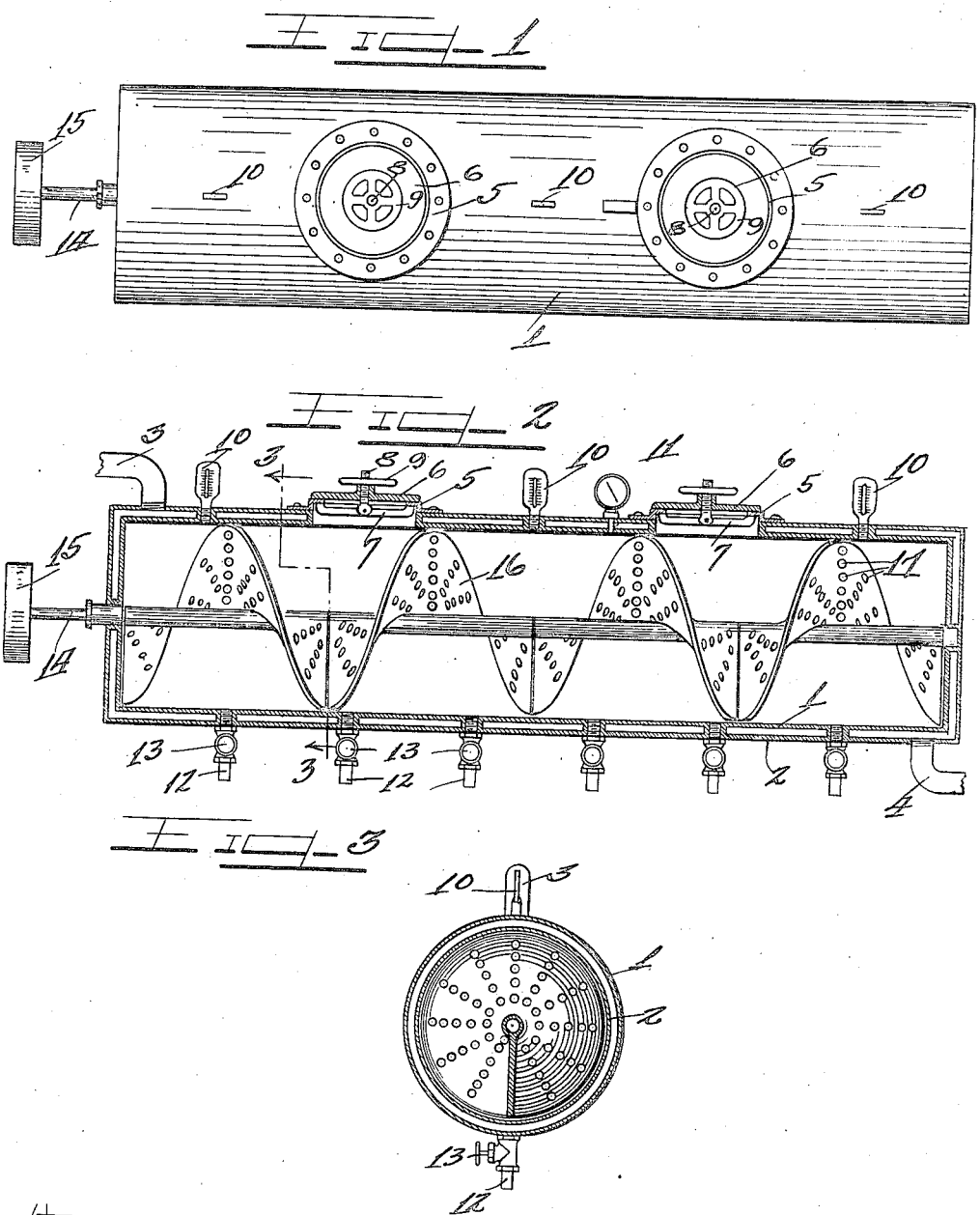

1,428,602

UNITED STATES PATENT OFFICE.

PHILIP MALEKOW, OF CHICAGO, ILLINOIS, ASSIGNOR TO BAKER FOOD PRODUCTS COMPANY, OF CHICAGO, ILLINOIS, A CORPORATION OF DELAWARE.

PROCESS FOR TREATING CHEESE.

Application filed April 19, 1920. Serial No. 374,856.

*To all whom it may concern:*

Be it known that I, PHILIP MALEKOW, a citizen of the United States, and a resident of the city of Chicago, in the county of Cook and State of Illinois, have invented certain new and useful Improvements in a Process for Treating Cheese; and I do hereby declare that the following is a full, clear, and exact description of the same, reference being had to the accompanying drawings, and to the numerals of reference marked thereon, which form a part of this specification.

This invention relates to a process and apparatus for treating cheese, more particularly in connection with the sterilization and subsequent canning of cheese. It has been proposed to sterilize cheese both of the soft varities such as Limburger, Camembert, Brie, etc., and also hard cheeses of the Cheddar genus, by heating them to sterilizing temperature and then placing the cheese so sterilized in cans and hermetically sealing the cans. Usually a temperature of about 175° F. is sufficient to kill all bacteria in the cheese.

Ordinarily soft cheeses may be heated to 175° F. without seriously injuring the quality of the cheese. In the case of the hard cheeses, however, it is desirable to agitate the cheese whilst it is subjected to heat to produce a homogeneous product, since under the action of heat without agitation cheeses of the Cheddar genus tend to separate into their constituent casein and fatty components and become stringy. In treating cheese of both classes, however, the action of the heat drives off a large part of the water and other volatile constituents and it has been found that the latter supply a large part of the flavor of the cheese and should therefore be retained as far as possible. The prevention of escape of water is of minor importance, although it is desirable to avoid the cheese becoming too dry. This is particularly important in connection with hard cheeses since the latter only contain about 35% water against 55 to 65% for the soft cheeses, and further, agitation, which is more necessary in the case of the hard than the soft cheeses, aids the volatilization of the water and volatile constituents.

It is an object, therefore, of the present invention to provide a process and apparatus in which the escape of these volatile constituents during the sterilization period is reduced to a minimum.

It is also an object of the invention to provide a process in which cheese is thoroughly agitated, during the heating treatment, in a closed chamber so that the combined advantages of heat and agitation are obtained with a minimum loss of volatile constituents.

Other and further important objects of this invention will be apparent from the disclosures in the drawings and specification.

The invention (in a preferred form) adapted to carry out the present process is illustrated in the drawings and hereinafter more fully described.

On the drawings:

Figure 1 is a plan view of heater and agitator adapted to carry out my improved process.

Figure 2 is a vertical central section through the same.

Figure 3 is a section on the line 3—3 of Figure 2.

As shown on the drawings:

The treating vessel comprises a cylinder 1 having a jacket or case 2 therearound to provide a space around the cylinder for the passage of heating fluid. Suitable connections to the space between the cylinder 1 and case 2, such as pipes 3 and 4, may be provided for the introduction and discharge of steam and condensed water respectively. For the introduction of cheese into the cylinder, manholes 5 are provided, adapted to be closed by lids 6, each held in place by a clamping bar 7 adapted to engage the edge of the manhole 5 when drawn upwardly by a screw 8 and hand wheel 9. In order that the temperature within the cylinder may be controlled, a thermometer 10 is provided so that the temperature within the chamber may be observed and the admission of steam into the jacket be controlled accordingly. A pressure gauge 11 may also be employed for the purpose of observing changes in pressure within the cylinder due to the action of heat upon the cheese. The melted cheese is discharged from the cylinder after it has been completely sterilized through a series of pipes 12 controlled by valves 13 into a series of cans arranged therebeneath. Since the method of canning the cheese as it is discharged from the sterilizing vessels forms no part of this invention, no further description is necessary.

Journaled in the ends of the cylinder 1 is a shaft 14 driven by a belt pulley 15 or other suitable means. Mounted on this shaft 14 within the cylinder 1 are a series of agitator blades 16, which serve to keep the contents of the cylinder constantly in movement with a view to preventing separation of the constituent parts of the cheese and insuring a uniform product. As shown, these agitator blades are of helical form, each section having an opposite angular twist in order to prevent movement of the mass of cheese from one end of the chamber to the other, while at the same time providing a longitudinal, to-and-fro movement of the cheese within the cylinder as well as a rotary or rolling movement about the axis of the cylinder. Further to aid the mixing operation rows of apertures 17 may be formed in each of the agitator blades through which the melted cheese may extrude as the agitator blades revolve.

If desired, the gases remaining in the cylinder after the discharge of the melted cheese may be passed through a condenser and the liquid so obtained added to a further batch of cheese.

The operation is as follows:

The lids 6 are removed, and sufficient cheese, preferably in comminuted form, is admitted so that when melted the cylinder is two-thirds full. The lids are then replaced and clamped in position, and steam is admitted to the jacket around the cylinder by means of pipe 3 and the agitator put into operation. When the temperature reaches 175° F. the steam supply is reduced so as to prevent the temperature rising substantially beyond that limit in order to avoid any more volatilization of the water and other volatile constituents than is absolutely unavoidable. After a short period of treatment at 175° F., say ten minutes, a row of cans is placed underneath the pipes 12, the valves 13 are opened, and cheese is allowed to flow from the cylinder into the cans. When one set of cans has been filled, a second set is placed under the pipe 21 and so on until all of the cheese in the cylinder has been disposed of. Ordinarily a slight pressure is produced in the cylinder owing to the volatilization of small quantities of water, volatile amines, and other organic substances in the cheese. This slight pressure enables the cheese for the first set of cans to flow readily out of the cylinder, but it may be necessary to admit air into the cylinder through one of the manholes 5 before all of the cheese can be discharged through the pipes 12, since otherwise a slight vacuum may be formed in the chamber which would prevent the cheese from flowing out.

I claim as my invention:

1. The process of sterilizing and canning cheese which includes heating the cheese to sterilizing temperature and simultaneously agitating the cheese in a closed chamber to produce a homogeneous product with a minimum loss of volatile material.

2. The process of sterilizing and canning cheese which includes introducing comminuted cheese into a closed chamber, heating, and simultaneously agitating the cheese in said chamber until completely sterilized, and then discharging the cheese from the chamber into cans.

In testimony whereof I have hereunto subscribed my name in the presence of two subscribing witnesses.

PHILIP MALEKOW.

Witnesses:
RIDSDALE ELLIS,
EARL M. HARDINE.